(No Model.)  2 Sheets—Sheet 1.

C. PARKER & A. R. TREPAGNIER.
TROLLEY BAR.

No. 538,844.  Patented May 7, 1895.

Witnesses:
J. B. McGirr.
F. S. Ricketts

Inventors
Clarence Parker and Arthur R. Trepagnier
per M. L. Moran,
Attorney.

(No Model.) 2 Sheets—Sheet 2.
C. PARKER & A. R. TREPAGNIER.
TROLLEY BAR.
No. 538,844. Patented May 7, 1895.
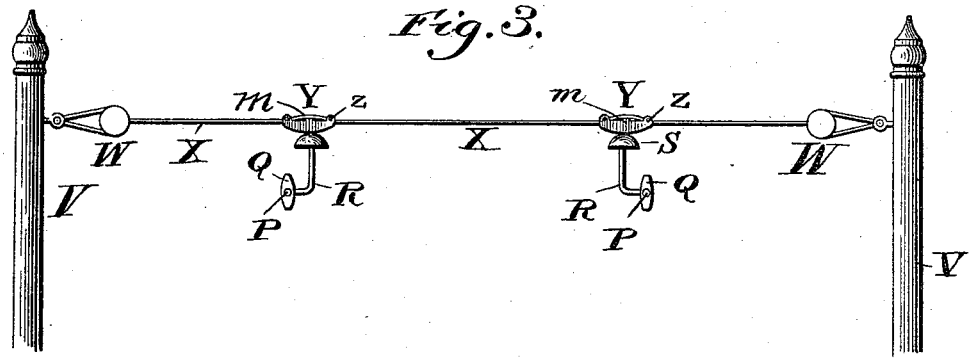
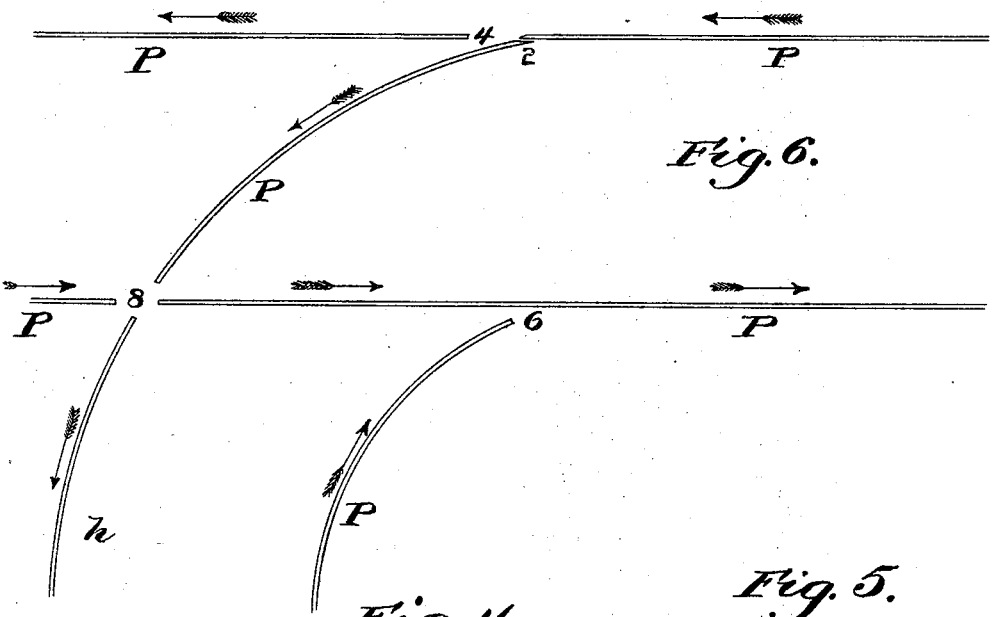
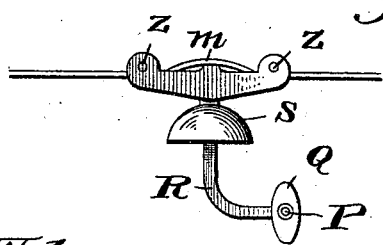
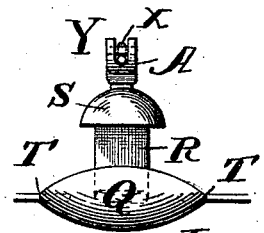
Witnesses:
J. B. McGirr.
F. J. Ricketts.
Inventors
Clarence Parker and Arthur R. Trepagnier
per M. L. Moran, Attorney.
THE NORRIS PETERS CO., PHOTO-LITHO., WASHINGTON, D. C.

UNITED STATES PATENT OFFICE.

CLARENCE PARKER AND ARTHUR R. TREPAGNIER, OF NEW ORLEANS, LOUISIANA.

TROLLEY-BAR.

SPECIFICATION forming part of Letters Patent No. 538,844, dated May 7, 1895.

Application filed July 13, 1894. Serial No. 517,437. (No model.)

*To all whom it may concern:*

Be it known that we, CLARENCE PARKER and ARTHUR R. TREPAGNIER, citizens of the United States, residing at New Orleans, in the parish of Orleans and State of Louisiana, have invented certain new and useful Improvements in Trolley-Bars; and we do hereby declare the following to be a full, clear, and exact description of the invention, such as will enable others skilled in the art to which it appertains to make and use the same.

This invention relates to trolleys of that class in which two wheels bear upon the wire or conductor and it also relates to the support for the conductor wire which is adapted for use with this particular kind of trolley.

The object of the invention is to produce a trolley which will not leave the wire by being thrown off by the motion of the car, and also one which may be easily manipulated with certainty.

A further object is to provide a trolley and a wire support therefor by which a constant and even contact with the wire is at all times assured and all loss due to sparking is prevented.

The invention consists in a certain construction and arrangement of parts herein described and claimed.

Figure 1:
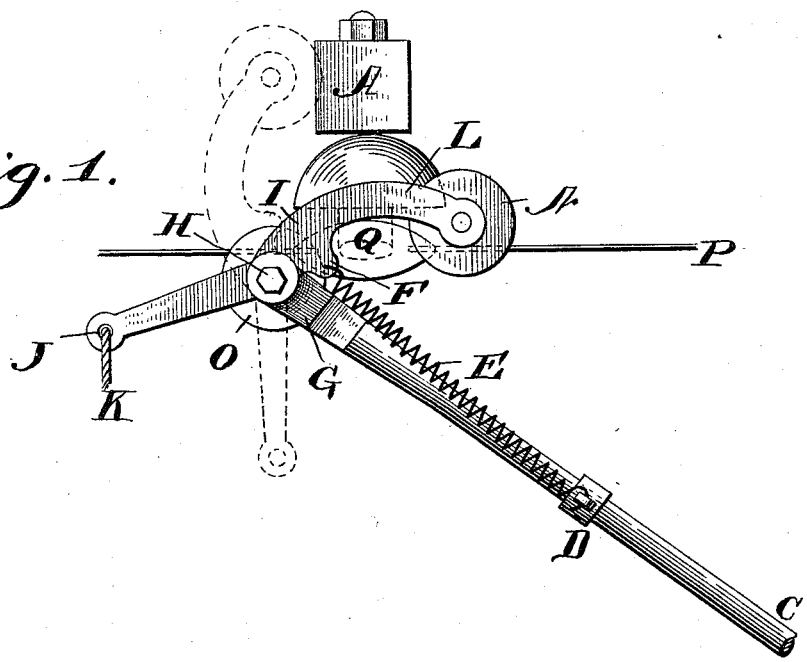
Figure 2:
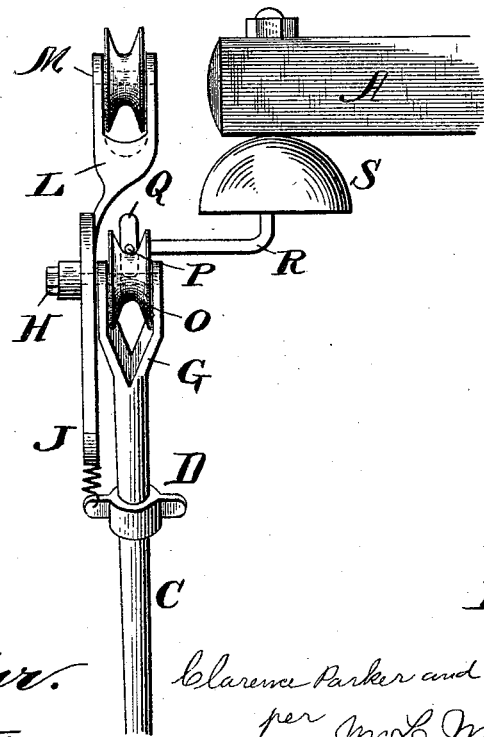

In the drawings, Figure 1 is a side elevation of the trolley shown as passing one of the supports of the line-wire. Fig. 2 is an end view of the same. Fig. 3 is a view showing the wire-supporting brackets hung from the crosswire supported by poles on either side of the street. Fig. 4 is a side elevation of this bracket on a larger scale. Fig. 5 is an end view of the same. Fig. 6 is a diagram showing the position of the wires at a turnout.

In Figs. 1 and 2 A, represents the arm of a trolley pole and R, is the bent hanger or bracket bolted thereto and supports the line wire P.

C, represents the trolley bar secured to the top of the car by the ordinary connections and at its upper end it carries the under or lower trolley wheel, O, bearing on the under side of the line wire. Pivoted on the axis of the wheel, O, is the supplemental bar, I, which has a curved part extending upward and forward and carries wheel, N, at its forward end bearing on the top of the wire. The bolt, H, passes through the fork, G, in which wheel O, rotates and gives the bar, I, good stability. The supplemental wheel, N, is held in the fork L, of the bar, I, by the bolt, M. The bar I, also has a part extending rearwardly provided with an eye, J, to which the conductor's rope, K, is attached.

The spring E, is fastened to the supplemental bar I, at a point, F, and also at its other end to a clamp, D, on the bar C. This clamp is made adjustable so that it may be moved up or down on the bar thus varying the tension of spring, E. This spring holds the top trolley wheel firmly against the top of the wire, P, but its tension is always less than the main springs which hold up the main trolley bar so that when the conductor pulls his rope the supplemental bar, I, assumes a vertical position as shown in dotted lines, Fig. 1. Then by a little stronger pull the wheel O also is disengaged from the wire and the bar may be swung around into any desired position. If contact with any particular wire is desired the bar is merely swung around until the supplemental bar, I, strikes the wire, then by releasing the pull on the rope both wheels come into position. This makes the operation very simple and accurate and avoids the necessity of making numerous ineffectual trials to "find" the wire as is the case with the one wheeled trolley; but the greatest advantage derived from the use of this upper and lower wheel trolley is the continuous and even contact with the wire which is constantly secured. If one wheel strikes a cut or an obstruction and its contact with wire is disturbed the other wheel still maintains perfect connection and the motor receives the full strength of the current continually thus avoiding any loss due to sparking and securing smooth and easy running.

In order to adapt the wire supports for use with the trolley the junction pieces, Q, are provided at each pole or support where they are attached to the bent hangers, R. The junction piece, Q, is tapered and supports the trolley wires which are soldered in at the points, T, T. The tapered piece, Q, is sufficiently deep at the center to cause the trolley wheels to separate enough so that their flanges will clear the bracket, R. The wheels are also a sufficient distance apart so that the forward wheel will have passed the piece, Q, before the rear wheel strikes it.

The cap, S, is intended to protect the connections from the rain which would destroy the insulating properties of the point in wet weather. In Figs. 3, 4, and 5, the trolley wires are suspended from crosswires X, fastened to poles V, on opposite sides of the street. W, W, are the insulators which carry the crosswire.

The attachment, Y, which connects the bracket to the crosswire, is provided with two pins, Z, Z, at its ends, and a lug $m$, at the center.

The cross wire is made to pass under the pins and over the lug thus binding the attachment to the cross wire and preventing the longitudinal movement thereon, also at the same time holding the bracket very firmly and preventing the wire from sagging. In practice the wires, X, X, are first strung up and tightened after which the attachment pieces are forced into position and pinned. If it is desired to shift the pieces Y, Y, at any time or remove them, it is easily done by removing the pins, Z, Z.

Referring to Fig. 6, it will be noted that the right hand side is the going up side while the left hand side is the going down side as indicated by the arrow points.

P, P, P, P, P, P, are the trolley wires, and at the point 2 there is a branch line shown switching off into another street. The trolley arm I, carrying the supplemental wheel N, runs on the right hand side of the trolley wires P, so that when the car passes the point 2, 4, the conductor can leave his trolley in position and pass straight on without any trouble. There is a separation between the switch wire and the main wire at the point 2, and just enough of a separation to allow the flanges of the wheels N and O to pass between and no more. Therefore there is no continuity between the main and branch wires, and this allows the trolley to pass on undisturbed when on the main line.

When a car comes down on the main line it passes the points 8 and 4 by a small jump that is hardly noticeable, and no spark is the result, because the first pulley N reaches the farther side of the wire before the wheel O leaves the previous wire, and therefore the circuit is never opened. There is sufficient space provided between all of the branch wires to allow the bar I to pass without striking. Now, if it is the intention of the conductor to leave the main line and switch off onto the branch shown, he simply pulls on the rope K sufficiently firm to overcome the tension of the spring E, which will of course allow the wheel and bar I and N to assume the vertical position and then by carrying his rope (still under tension) toward the direction in which the car is to switch off, the side of the bar I, will then bear against the side of the wire that crosses at 8 when he can then release his hold and allow the trolley wheel N, to assume the original position that it had on the main line before reaching this point.

When the car comes down as indicated by the arrow points, and on the right side of the system again, there is no special precaution to be taken as it will follow the main line without any difficulty whatever. When however, a car comes down from the branch line, the conductor again puts the same tension on bar I, and holds the rope firmly in the direction to keep the side of the said bar I, against the side of the trolley wire P. When once on the main line he then releases his hold on the rope K, and the wheels again take their proper position.

We claim—

1. A trolley comprising the lower wheel at the end of the main bar, the supplemental bar pivoted on the main bar and the upper wheel carried at the forward end of the supplemental bar, and bearing on the top of the wire or conductor.

2. In a trolley the main bar carrying the lower wheel at its end bearing on the under side of the wire, the supplemental bar, pivoted on the main bar, the upper wheel adapted to bear on the top of the wire at the forward end of the supplemental bar and the conductor's rope attached to the rear end of the supplemental bar on the other side of the pivot.

3. In a trolley the main bar carrying the lower wheel at its end, the supplemental bar pivoted on the main bar, the upper wheel at the forward end of the supplemental bar and the spring attached to said supplemental bar whereby the upper wheel tends to bear down on the top of the wire.

4. In a trolley the main bar, the lower wheel at its end, the supplemental bar pivoted on the axis of the lower wheel, the upper wheel at the forward end of the supplemental bar, the spring connected to the main bar and to the supplemental bar and the rope attached to the rear end of the supplemental bar.

5. A wire support for the upper and lower wheeled trolley which consists of the hanger, R connected with the side of the junction piece, the protecting cap S and the junction piece connecting the wires, the depth of the junction piece being greater than that of the trolley flanges and its length less than the distance between the trolley wheels substantially as described.

6. The support for the wire consisting of the pieces Y, having pins Z, and lug $m$, the hanger R attached to the center of the side of the junction piece, said junction piece being tapered or diamond shaped with a depth greater than that of the trolley flange and a length less than the distance between the trolley wheels substantially as described.

In testimony whereof we affix our signatures in presence of two witnesses.

CLARENCE PARKER.
ARTHUR R. TREPAGNIER.

Witnesses:
WM. R. KER,
A. L. LANAUZE.